United States Patent [19]
Davis

[11] 3,797,604
[45] Mar. 19, 1974

[54] INSULATED MOUNTING FOR PLATFORM AND CAB

[75] Inventor: Owen R. Davis, Waukesha, Wis.

[73] Assignee: Allis-Chalmer Corporation, Milwaukee, Wis.

[22] Filed: Dec. 12, 1972

[21] Appl. No.: 314,340

[52] U.S. Cl. ............................. 180/89 R, 296/35 R
[51] Int. Cl. ............................................. B62d 39/00
[58] Field of Search ........ 180/89 R; 296/35 R, 28 C

[56] References Cited
UNITED STATES PATENTS 1,842,214  1/1932  Sullivan............................ 296/35 R
1,881,777  10/1932  MacPherson ...................... 296/35 R Primary Examiner—Richard A. Schacher
Attorney, Agent, or Firm—Arthur L. Nelson

[57] ABSTRACT

A vehicle having a chassis mounted unsprung on a plurality of wheels with a platform mounted on resilient means seated on planar surfaces formed on the chassis of the vehicle and fastening means to resiliently suspend the platform in this position.

10 Claims, 7 Drawing Figures

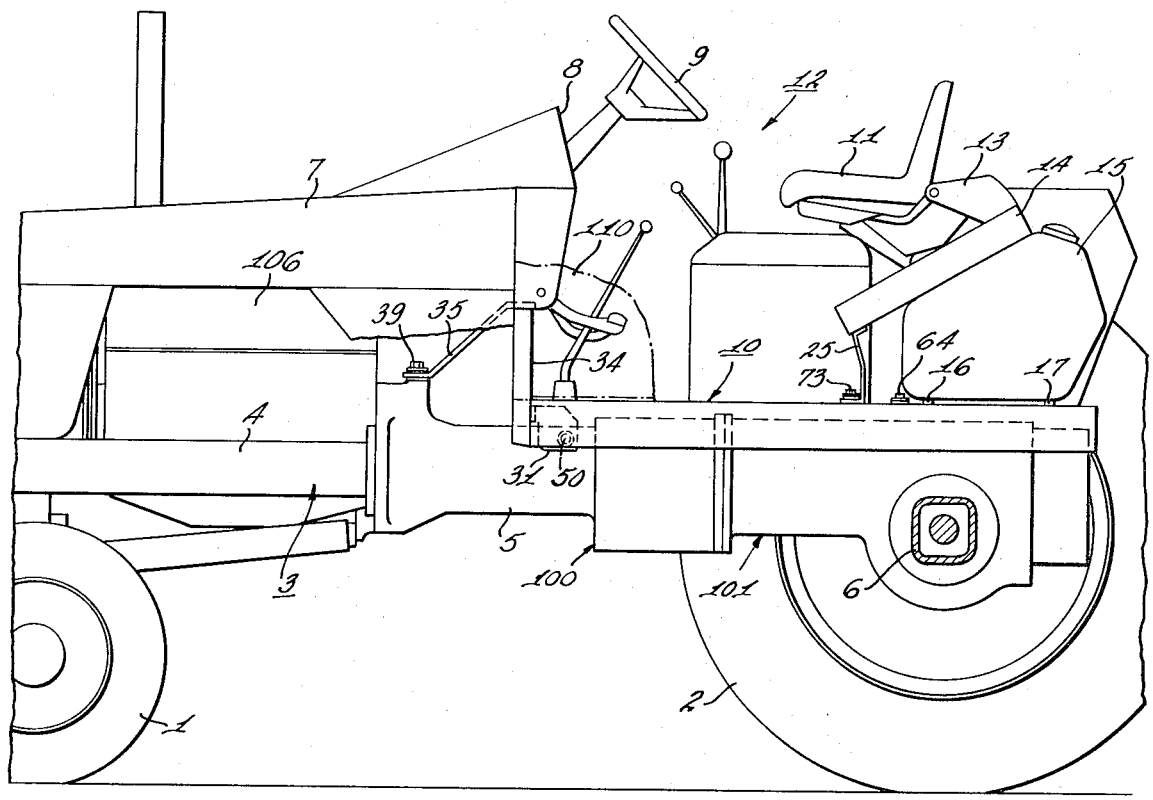

INSULATED MOUNTING FOR PLATFORM AND CAB

This invention relates to a mounting for a platform and cab on a vehicle having a chassis unsprung on a plurality of rotating wheels and more particularly relates to a means forming mounting surfaces on the housing of the drive train of the vehicle with fastening means resiliently suspending the platform and/or cab in this position.

Conventionally tractors, front end loaders, back hoes and other earth moving vehicles have been constructed without any resilience in their suspension systems. This type of a vehicle has been acceptable over the years primarily because of the economy achieved by constructing a vehicle in this manner. Some of the vehicles today used for these purposes, however, are becoming increasingly larger and more powerful than their predecessors and likewise produce more noise and vibrations which are becoming objectionable.

Accordingly, some work has been done in this area whereby modified suspension systems have been used employing resilient means to support the vibration producing components of the vehicle as well as isolating the operator's station on the vehicle. These mounting devices, however, usually employ special brackets and rubber insulators to improve the operating conditions of the tractor. Their use, however, in some cases substantially increases costs of the vehicle which although it can only be acceptable in the larger vehicles where the increase in cost is a smaller percentage of the total cost of the vehicle. In the smaller type vehicle the improvement in the operating conditions does, however, warrant use of some vibration and noise dampening devices.

Accordingly, this invention provides a means for resiliently mounting the platform and/or cab on the vehicle chassis. The vehicle chassis includes the drive train housing with machined surfaces for mounting of resilient isolators for supporting the platform. Fastening means resiliently compresses rubber isolators against the surfaces of the platform and retain the platform in a resiliently suspended position.

It is an object of this invention to provide resilient means for supporting the platform and/or the cab on the vehicle chassis.

It is another object of this invention to provide a resilient mount of the plarform and/or the cab on the chassis wherein machined surfaces on the drive train housing provide a base for supporting resilient means which resiliently retain the platform and/or the cab in an operating position.

It is a further object of this invention to provide planar surfaces on the power transmission housing with threaded openings for threadedly receiving bolts which retain isolators on the supporting surface forming resilient means compressively retaining the platform in a resiliently suspended position on the vehicle.

The objects of this invention are accomplished by providing machined surfaces on the drive train housing in the area of the tractor defined by the operator's station. These machined surfaces have tapped and drilled holes for receiving a plurality of bolts. The bolts are received within metallic sleeves and washers which are embraced by resilient bushings and washers which engage the upper and lower surfaces of the platform immediately surrounding the perforations. Each bolt when fastened compressively seats the resilient washers and bushings firmly against the upper surfaces of the platform to resiliently suspend the platform. Additional machined surfaces carrying resilient pads are also formed on the housing to support the weight of the platform, the seat and fuel tank. This combination of resilient support for the platform does not require brackets or additional support structure used on conventional tractors.

The preferred embodiment of this invention is illustrated in the attached drawings in which:

FIG. 1 illustrates a side view of the vehicle with the platform and a section of the cab shown in phantom mounted thereon;

FIG. 2 illustrates a cross section view taken through the isolator mounted within the engine compartment;

FIG. 3 is a cross section view taken on line III—III of FIG. 6;

FIG. 4 is a cross section view taken on line IV—IV of FIG. 5;

Figure 5:
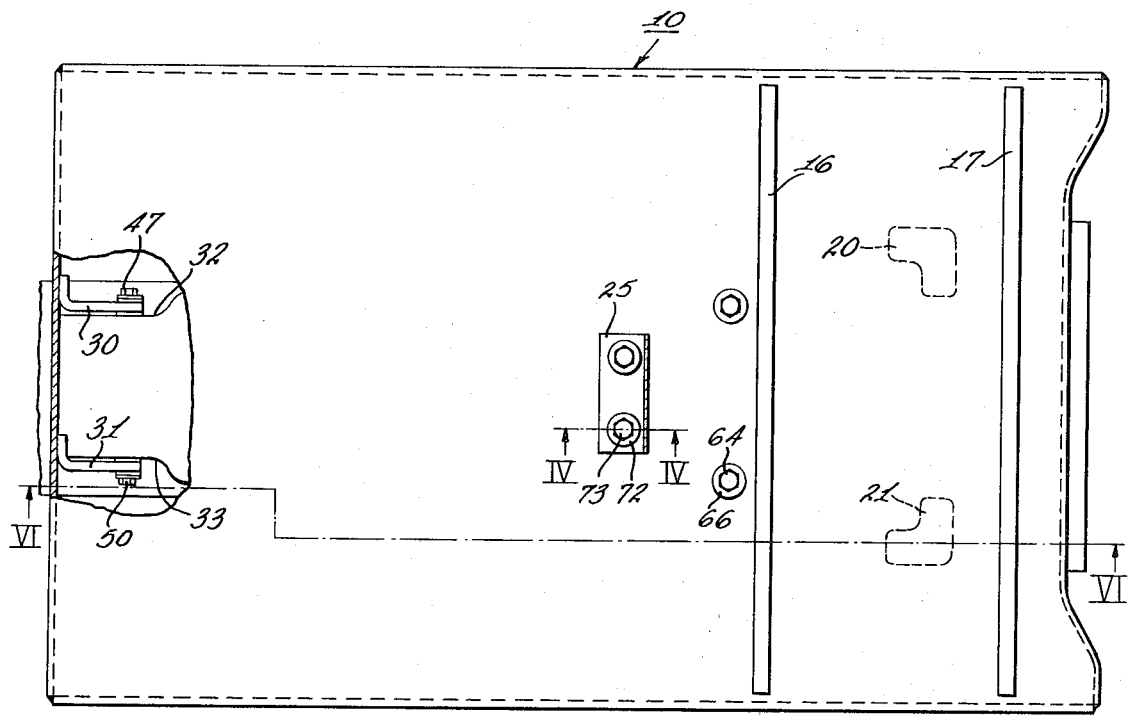
FIG. 5 is a plan view of the platform as mounted on the vehicle.

FIG. 1 shows a side view of the tractor. A pair of front wheels 1 and a pair of rear wheels 2 rotatably support the vehicle chassis 3 which is unsprung on the wheels. The vehicle chassis 3 includes a frame 4 connected to the drive train housing 100 which includes the transmission housings 5, rear drive transmission housing 101 and rear axle housings of which hounsing 6 is shown. The chassis 3 supports the engine 106 and the engine hood 7 and instrument panel 8. The steering wheel 9 is supported with the instrument panel 8 on the chassis.

The housing 5 supports the platform 10 through resilient isolators which will be subsequently described. The steering wheel 9, seat 11 and platform 10 generally define the operator's station 12. The seat 11 is mounted on the linkage 13 which in turn is carried on the seat mounting 14. The seat mounting 14 is carried on the platform 10. The fuel tank 15 is also carried on the platform 10 and rests on the transverse abutments 16 and 17.

Since the platform 10 is resiliently mounted on the chassis 3, a suitable resilient joint is provided between the engine hood 7, the instrument panel and the platform 10.

Figure 6:
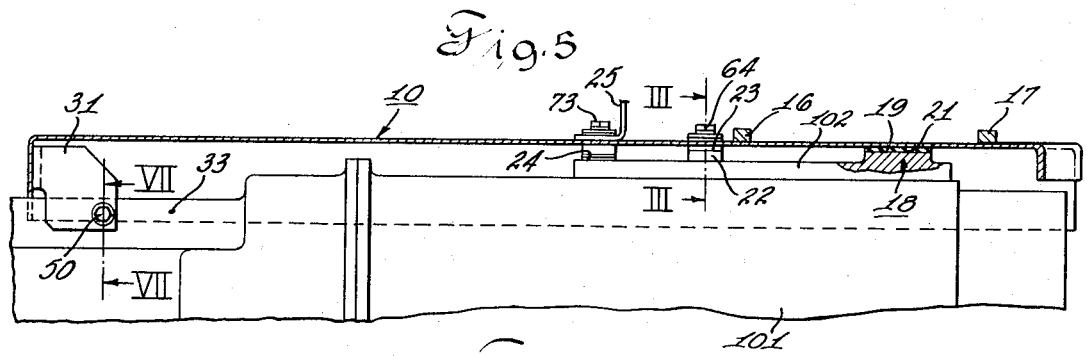
FIG. 6 is a cross section view taken on line VI—VI of FIG. 5.

Referring to FIGS. 5 and 6, the platform is shown in a plan view and also in a section view. The platform 10 carries the transverse abutments 16 and 17 which are shown in section in FIG. 5. The cover 102 on housing 101 forms two raised embossments 18, of which one is shown in FIG. 6. Each embossment defines a supporting surface 19 adapted for supporting resilient pads 20 and 21. When the platfom is aligned the pads 20 and 21 seat on the surfaces of the embossments of which the embossment 18 is shown in FIG. 6.

The embossment 22 forms the surface 23 for seating on a rubber isolator. Similarly a machined surface 24 is formed forwardly of the embodiment 22. The surface 24 supports rubber isolators which in turn resiliently support the platform as shown in FIG. 4. Together with the platform it also supports the seat through the bracket 25. The platform seats on a plurality of surfaces as indicated and is maintained in this resilient position by the use of a plurality of bolts and also by the weight of the fuel tank 15 which sets on the transverse abutments 16 and 17.

The forward end of the platform 10 is suspended on its underside by integral flanges 30 and 31 which are in spaced relation to each other. These flanges integral with the platform 10 provide a means to eliminate any transverse movement which may be imposed by the platform per se. The transmission housing forms the vertical surfaces 32 and 33 which extend upwardly between the flanges 30 and 31. Rubber isolators are positioned on each of the flanges and fastened by means of a bolt to resiliently support the front end of the platform 10 to restrict its transverse movement relative to the drive train housing.

A forward wall 34 is connected to the forward end of the platform 10 which in turn is connected to a strap 35. The forward end of the strap 35 is resiliently mounted on a rubber isolator similar to the other isolators for limiting movement of the platform and providing resilient support. The strap 35 tends to reduce vibration on the forward end of the platfrom 10. A cab 110 is shown in phantom mounted on the platform 10.

Referring to FIG. 2, the flywheel housing which is a part of the transmission housing 5 is machined to form a supporting surface 37. The flywheel housing also has a tapped and drilled hole 38 for receiving the bolt 39. The strap 35 is formed with the perforations 40 for receiving the metallic sleeve 41 encircling the bolt 39 which in turn is embraced by the rubber bushing 42 which has a head 43 with its lower surface engaging the machined surface 37. A rubber washer 46 is seated on the upper side of the strap 35 and the compressive force of tightening the bolt 39 presses lock washer 45 against the steel washer 44 to resiliently support the strap 35.

Figure 7:
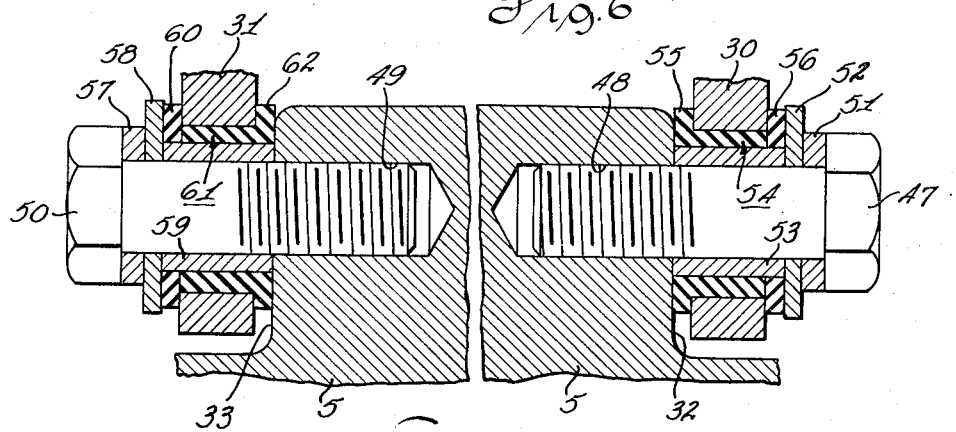
FIG. 7 is a cross section view taken on line VII—VII of FIG. 6.

Referring to FIG. 7, the housing 5 forms the two vertical surfaces 32 and 33 on opposing sides of the housing. Drilled and tapped holes 48 and 49 are also formed in the housing 5, each receive the bolts 47 and 50, respectively. The bolt 47 carries a lock washer 51 and a steel washer 52. A metallic sleeve 53 which provides the spacing between the steel washer 52 and the surface 32. The sleeve 53 is embraced by a resilient bushing 54 having a head 55. A resilient washer 56 is positioned under the steel washer and as the bolt 47 is tightened, the resilient bushing 54 and resilient washer 56 compressively position the flange 30 to resiliently suspend the platform 10.

Similarly, the bolt 50, lock washer 57 and steel washer 58 when tightened against the spacer sleeves 59 compressively position the flange 31 between the resilient washer 60 and bushing 61 with the head 62.

Referring to FIG. 3, the embossment 22 of the housing cover 102 forms a surface 23. The bolt 64 engaging lock washer 65 and steel washer 66 retain predetermined spaced relation with the surface 23 when tightened against the metallic sleeve 67. The resilient bushing 68 with its head 69 compressively seats against the platform 10 on its underside. The resilient washer 70 resiliently seats on the upper surface of the platform in the position as shown in FIG. 3.

Referring to FIG. 4, the housing cover 102 forms a surface 24 for supporting the platform and retained by the fastening means as shown. The bracket 25 supports the seat on the upper side of the platform 10. The sleeve spacer 71 engages the steel washer 72 as the bolt 73 is tightened against the lock washer 74. The resilient bushing 75 with its head 76 engages the spacer 77 as the steel washer is compressed against the resilient washer 78 when the bolt 73 is tightened. This assembly resiliently supports the platform 10 and the seat 11.

The suspension of the platform on the machined surfaces of the housing eliminates the need for a plurality of brackets positioned on the rear drive axles or on the side of the transmission housing as is conventionally done. This provides a firm seating for the resilient isolators and provides a means whereby the surfaces can be machined with relation to each other since the surfacing of the support surfaces are all formed on a single component. The provision of mounting surfaces on the housing provides simplicity and economy which is not possible when the supporting structures are formed of separate components separately mounted on the vehicle chassis to provide support for resiliently mounting the platform and/or the cab relative to the chassis.

The embodiments of the invention in which an exclusive property or privilege is claimed are defined as follows:

1. A vehicle having a resiliently mounted platform on a chassis comprising, a vehicle chassis mounted unsprung on a plurality of wheels, said chassis including a power transmission housing, means defining a plurality of horizontal planar support surfaces on said housing, a platform, having a seat fastened thereto defining an operator station, a plurality of fastening means integrally fastened to said housing at said planar support surfaces and defining a platform holding surface in spaced relation to said planar surfaces with said platform positioned between said surfaces, resilient means compressively positioned between said holding surface of said fastening means and said planar surfaces of said housing to resiliently support said platform on said chassis.

2. A vehicle having a resiliently mounted platform on a chassis as set forth in claim 1 including a cab mounted integral with said platform.

3. A vehicle having a resiliently mounted platform on a chassis as set forth in claim 1 wherein said fastening means includes a plurality of bolts.

4. A vehicle having a resiliently mounted platform on a chassis as set forth in claim 1 wherein said fastening means includes a plurality of bolts, a washer and a metallic spacer on each of said bolts, resilient means for engaging said washer and said planar surface and compressively engaging the upper and lower surface of said platform to thereby provide resilient supporting means for said platform.

5. A vehicle having a resiliently mounted platform on a chassis as set forth in claim 1 wherein said chassis includes said housing and defines mounting surfaces, a resilient pad on each of said mounting surfaces for supporting the weight of said platform surfaces.

6. A vehicle having a resiliently mounted platform on a chassis as set forth in claim 1 wherein said fastening means includes a plurality of bolts, a metal bushing with each bolt received within said resilient means, a portion of said resilient means extending over and under said platform for compressively positioning said platform on resilient means relative to said bolt and said chassis.

7. A vehicle having a resiliently mounted platform on a chassis as set forth in claim 1 including means defining an operator's station on said platform, a seat connected integrally with said platform, a gasoline tank mounted on said platform.

8. A vehicle having a resiliently mounted platform on a chassis as set forth in claim 1 including means defining a plurality of holes in said platform, each of said fastening means including a bolt extending through one of said holes, a washer embracing said bolt, a resilient cylindrical bushing having a circumferential groove received on said bolt for resiliently supporting said platform when said bolt is supported in said chassis.

9. A vehicle having a resiliently mounted platform on a chassis as set forth in claim 1 wherein said platform defines a plurality of holes, each of said fastening means includes a washer, a bolt received in said washer and extending through one of said holes in said platform, a metallic sleeve embracing said bolt and engaging said washer in said chassis providing a predetermined spaced relationship between said washer and said chassis, a resilient cyclindrical bushing having a circumferential groove received on said sleeve with said groove receiving the portion of said platform surrounding one of said holes to thereby resiliently support said platform.

10. A vehicle having a resiliently mounted platform on a chassis as set forth in claim 1 wherein said platform defines a plurality of holes, each of said fastening means includes a bolt extending through one of said holes in said platform for fastening to said chassis, a metallic sleeve received on said bolt, a washer on said bolt engaging one end of said sleeve, a resilient bushing defining a head for engaging said chassis and snuggly engaging said metallic sleeve and extending through said one of said holes of said platform, a resilient washer engaging the end of said resilient bushing and resiliently engaging the top of said platform while the head of said bushing engages the bottom of said platform to thereby resiliently support the chassis on said platform.

* * * * *